March 13, 1934.  L. B. GREEN  1,950,792
SHUTTER FOR AUTOMOBILE RADIATORS
Original Filed Oct. 13, 1931   3 Sheets-Sheet 1

Inventor:
Lee B Green
by Albert Scherbel
Attorney

March 13, 1934. L. B. GREEN 1,950,792
SHUTTER FOR AUTOMOBILE RADIATORS
Original Filed Oct. 13, 1931 3 Sheets-Sheet 2
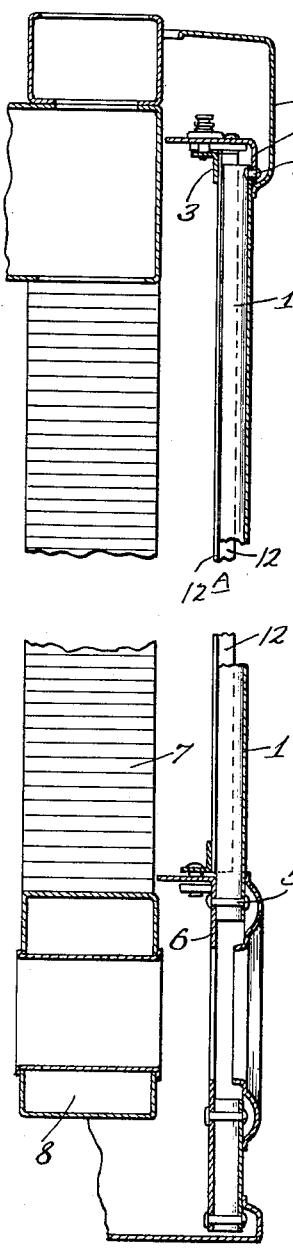
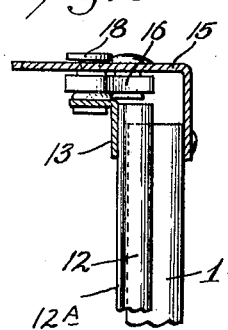
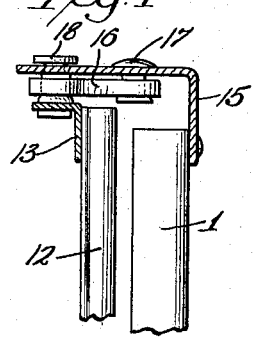
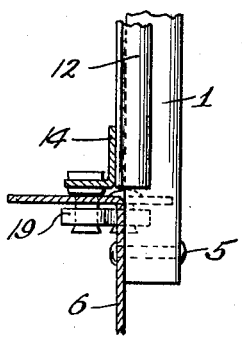
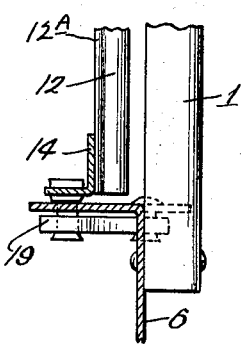
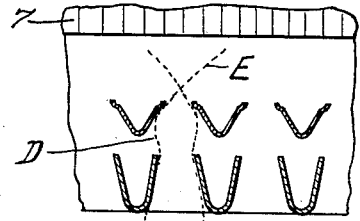
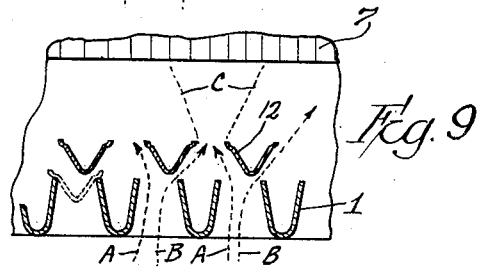
Inventor:
Lee B. Green
by Albert Scheible
Attorney March 13, 1934.　　　L. B. GREEN　　　1,950,792
SHUTTER FOR AUTOMOBILE RADIATORS
Original Filed Oct. 13, 1931　　3 Sheets-Sheet 3
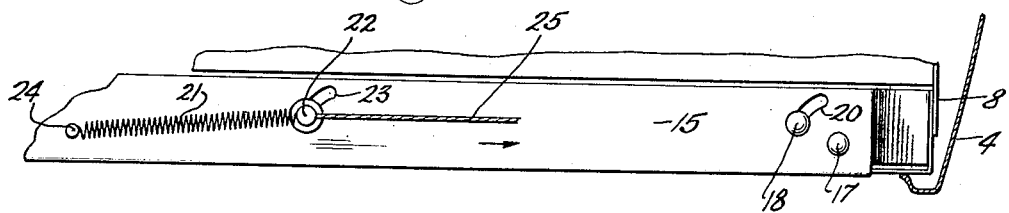
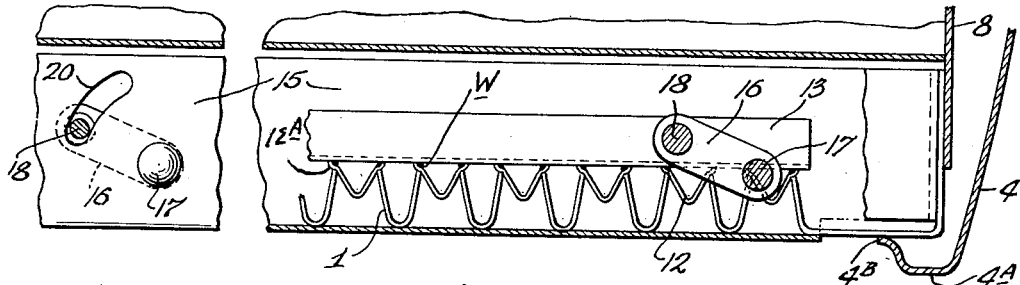
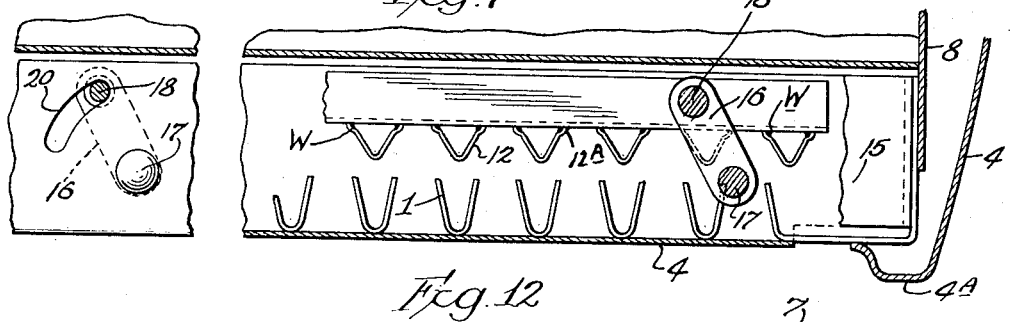
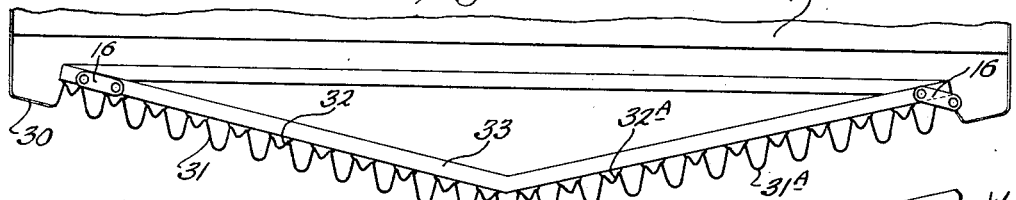
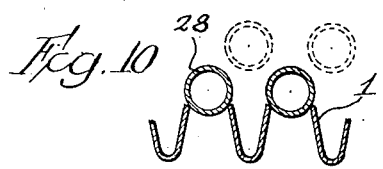
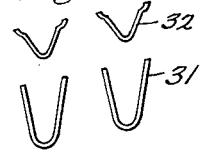
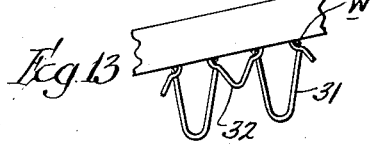
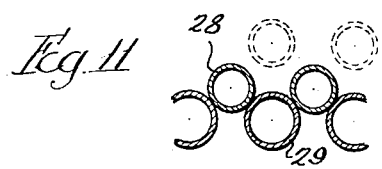
Inventor:
Lee B. Green
by Albert Scheibli
Attorney Patented Mar. 13, 1934

1,950,792

UNITED STATES PATENT OFFICE 1,950,792

SHUTTER FOR AUTOMOBILE RADIATORS

Lee B. Green, Lakewood, Ohio, assignor to The Globe Machine & Stamping Company, Cleveland, Ohio, a corporation of Ohio Application October 13, 1931, Serial No. 568,573
Renewed January 26, 1934

10 Claims. (Cl. 189—62)

My invention relates to shutters for controlling the flow of air through an opening, and in its general objects aims to provide a shutter which will be decidedly superior to the pivoted blade types of shutters as to simplicity, low cost, rigidity, durability, appearance, noiselessness, and guarding effect.

With the customary metal shutters having pivoted sheet metal blades, a separate pivotal mounting is required at each end of every blade, as also a separate connection of each blade to a shutter-operating bar. These requirements mean that for every blade in the shutter the latter usually must have two separate blade-pivoting pins, a separately formed actuating pin pivoted in the operating bar, and sometimes also a separately formed bracket connecting the blade to this actuating pin, thus involving the cost of separately manufacturing and subsequently assembling of at least four auxiliary metal parts upon every blade of the shutter. Moreover, separate bores are required for each of the three pivoting pins and also for the actuating pin associated with every blade, thereby requiring a large amount of drilling and also permitting lost play at each of these three pins. This freedom of relative motion, which cannot readily be avoided in the commercial manufacture of such shutters at a modest cost, is apt to cause rattling noises, particularly when the shutter is used on a vehicle subject to vibrations and jarring. In one of its major objects, my invention aims to provide a metal shutter construction which will entirely eliminate the usual separate pivotal connections of the blades to their supports and to an actuating member, thereby greatly reducing the cost of the shutter and also greatly reducing the possible rattling.

With the customary pivoted-blade automobile radiator shutter, the blades also are too apt to be damaged by the impact of stones tossed against them by the wheels of other vehicles. If the shutter happens to be closed, the usual thin metal of the blades will not withstand any considerable impact directed substantially at right angles to the general plane of the blade; and if the shutter is not closed, a free edge of a blade may easily be bent by the impact of a stone or the like so as to prevent a complete closing of the shutter later on. My present invention aims to overcome these objections by providing a shutter in which the forward portions are formed so as to resist severe impacts, and in which no free edge parts of movable members are likely to receive any impact from an object projected against the shutter.

In automobile practice, it has also become a rather common practice to omit the radiator shutter during the eight or nine milder months of the year, and to substitute a grille or other guard which will be more handsome in appearance than a bladed radiator shutter, particularly when the screen or bars of the grille are nicely plated. However, in the northern half of this country the user still needs a radiator shutter during the colder months of the year to keep the radiator and engine in operative condition, so that the alternating use of a shutter for this protection and a grille for the sake of appearance entails an undesirable cost for the owner of the automobile.

My present invention aims to reduce this cost and to beautify the radiator front at all seasons of the year by providing a grille-type shutter which will have the appearance of a handsome parallel-bar grille in both the open and closed positions of the shutter.

Moreover, my invention aims to provide a combined shutter and grille or guard arrangement for this purpose which will be unusually simple and rigid in construction, which will require only a quite simple operating mechanism, which can be employed equally well with V-sectioned radiator fronts as with flat radiator fronts, and which also will have no forwardly exposed metal edge portions from which plating would be chipped off by the impact of gravel or the like.

Still further and also more detailed objects will appear from the following specification and from the accompanying drawings, in which drawings Fig. 1 is a fragmentary front elevation of an automobile radiator shell fitted with a grille-bar type of shutter embodying my invention, with portions of various parts broken away.

Fig. 2 is a vertical section through the same radiator shell and shutter, and through the core and watertanks of the adjacent radiator, taken along the line 2—2 of Fig. 1, with the shutter closed.

Fig. 3 is an enlargement of portions of the shutter of Fig. 2, with the shutter closed, and Fig. 4 is an enlargement of the same parts as they appear when the shutter is open.

Fig. 5 is a fragmentary horizontal section taken along the line 5—5 of Fig. 1 with the shutter closed.

Fig. 6 is a fragmentary and enlarged section taken along the line 6—6 of Fig. 1 with the shutter closed, and Fig. 7 is a section similar to that of Fig. 6 but taken with the shutter open.

Fig. 8 is a fragmentary and enlarged horizontal section taken along the line 8—8 of Fig. 1 through the shutter bars and the radiator core, with the shutter open, and with dotted lines indicating the flow of air to the cells of the core.

Fig. 9 is a section similar to that of Fig. 8 but taken with the shutter in a partly opened position, with dotted lines indicating the flow of air and also indicating the closed position of one shutter bar.

Figs. 10 and 11 are horizontal sections through stationary and movable bars of a shutter embodying my invention, showing shutter bars of other shapes than those of the preceding figures.

Fig. 12 is a plan-section through a radiator shell, shutter and part of the radiator core of an embodiment of my invention designed for a V-front effect.

Fig. 13 is an enlargement of a portion of Fig. 12.

Fig. 14 is a plan view showing the shutter bars of Fig. 13 in the open position of the shutter.

Figure 1:
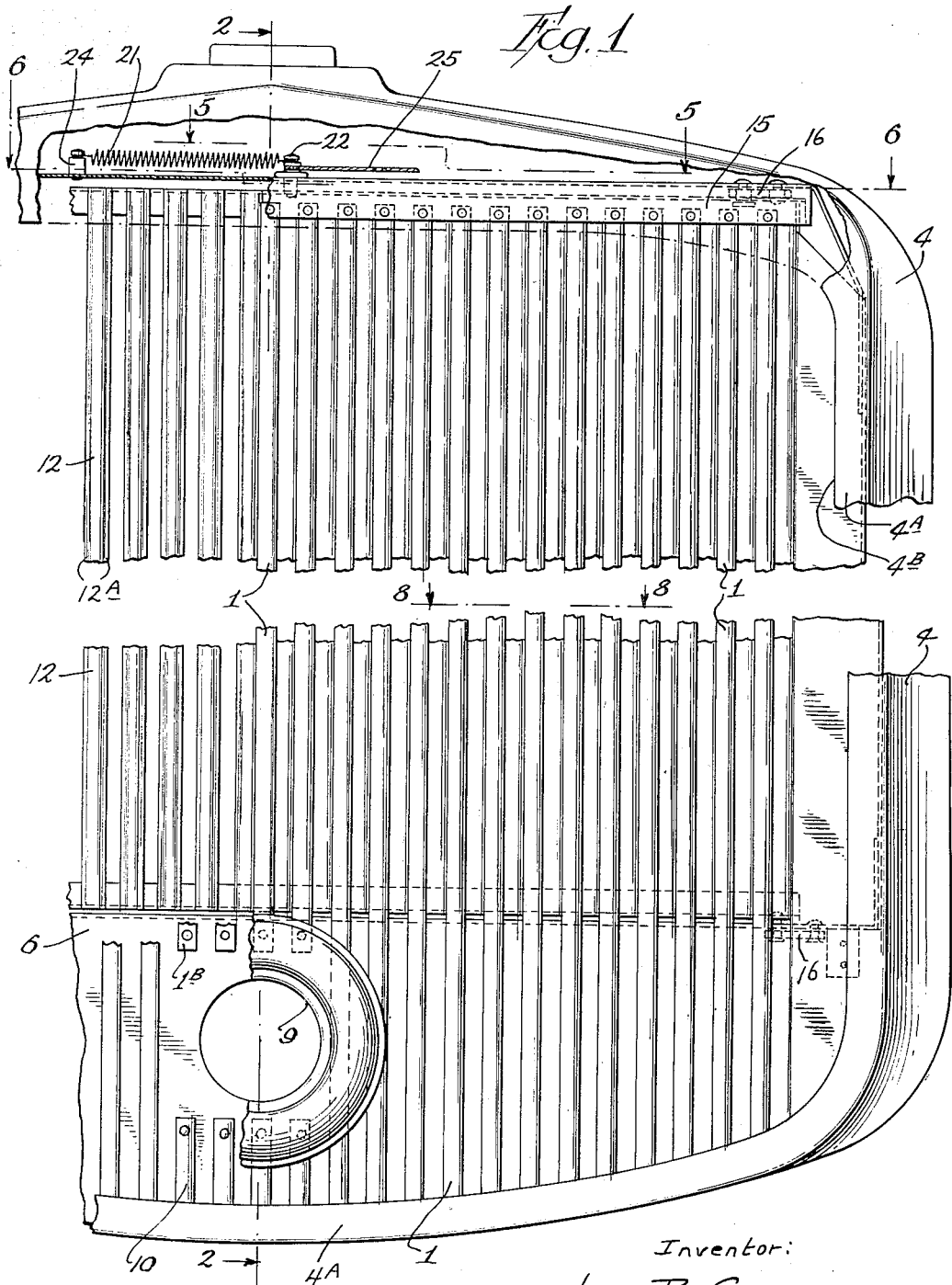

To accomplish the purposes of my invention in the here illustrated manner, I provide a stationary shutter member in the form of a parallel-bar grid consisting of rigidly cross-connected parallel bars of uniform consecutive spacing. These bars preferably are of counterpart cross-sections tapering forwardly, and for a shutter of the customary generally flat form, the rear edges of all bars are disposed in a common plane. In practice, each such bar desirably is a sheet metal channel of a substantially V-shaped section with the (desirably rounded) apex of the V-formation at the front or inlet face of the shutter, so that this stationary bar assembly in itself will have the appearance of a bar-type of grille or guard of the type now extensively used on automobiles.

To control the flow of air through the spaces between the consecutive bars of this stationary grid, I provide a second grid having similarly spaced bars each of such a width as to close the rear end of the opening between two consecutive stationary grid bars. Then I support this second grid so that it can be moved rearwardly and laterally with respect to the bars of the stationary grid for permitting air to flow through each such opening. For this purpose I preferably support this movable second grid so that it can be swung in an arcuate path with respect to the stationary grid while continually maintaining the general planes of both grids parallel to each other, as for example by operatively connecting the two grids by means of parallel links swinging in planes at right angles to the axes of all of the grid bars.

Illustrative of my invention as employed in connection with an automobile radiator front of flat type, Figs. 1 and 2 show a shutter including upright stationary bars 1 each formed of a strip of sheet metal bent flatwise along the longitudinal center line of the strip to constitute a rearwardly open channel of substantially V-shaped section. Each of these stationary bars is fastened by a rivet 2 to the depending web 3 of an angle-sectioned upper cross-bar extending behind the panel front 4A of the radiator shell 4 above the upper edge of the frontal opening 4B of this shell. Each stationary bar 1 likewise is secured by a rivet 5 to the depending web of a lower cross-bar 6 disposed near the bottom of the cell portion of the radiator core 7, both bars being supported in spaced relation to this core, as for example by brackets 8 fastened to the sides of the core.

Thus arranged, the parallel stationary bars, (which may easily be durably plated) together with the said upper and lower cross-bars, constitute a guard of the parallel-bar grille type for the dual purpose of preventing stones, sticks and the like from reaching the core cells, and of beautifying the radiator front. To enhance this ornamenting effect, I may extend the depending flange 6 of the lower cross-bar downwardly in front of the lower radiator tank 8 and behind the lower portion of the front face 4A of the radiator front so as to conceal this tank from view, as shown in Figs. 1 and 2. This allows most of the stationary bars 1 to present their lower portions in front of this web-like lower flange 6, while the bars 1B near the usual crank opening 9 can be shorter and effectively continued by short bars 10.

In the companion movable grid of my shutter, the upright bars 12 have their longitudinal axes spaced similarly to those of the stationary bars 1, these movable bars being all fastened (desirably by welding) to the upright flanges of two horizontal angle-sectioned cross-bars 13 and 14 which cross-bars desirably extend adjacent to the ends of all of the said movable bars so that they can be concealed from view respectively by upper and lower portions of the front 4A of the radiator shell. Each movable bar desirably has its major portion composed of a sheet metal channel 12 of rearwardly open V-shaped section and of a spread approximating the spacing of the rear end portions of two consecutive stationary bars 1, and each such channel 12 has its side edge portions 12A formed for abutting against the said rear end portions of the adjacent stationary bars when the shutter is closed, as shown in Fig. 6.

Thus arranged, the two cross-bars 13 and 14, together with the bars 12 (which may be termed shutter bars in distinction from the stationary grille bars 1) constitute a rigid grid forming the movable shutter member. Then I provide means for supporting and moving this movable shutter member so as to swing its bars both rearwardly and laterally from their closure positions of Fig. 6 to positions (as in Fig. 7) in which each shutter bar is directly behind one of the grille bars 1 of the stationary grid of the shutter. For this purpose I desirably connect the cross-bars of the stationary grid to those of the shutter bar assembly by movable supporting members of a parallel motion type, and provide stop means for halting the opening movement of this shutter bar assembly in a position affording the maximum flow of air through the shutter.

Illustrative of a simple arrangement for these purposes, I connect each cross-bar 13 and 14 of the shutter bar assembly to the adjacent cross-bar (3 or 6) of the stationary or grille bar assembly by two parallel links, each link being pivotally connected at its opposite ends to the adjacent two cross-bars on axes parallel to those of all the shutter and grille bars; so that the four links not only support the movable shutter-bar assembly from the cross-bars of the grid bar assembly, but also afford a parallel-motion connection between the two sets of bars.

Thus, the drawings show two upper links 16 each pivoted near its forward end on an upright rivet 17 depending from the upper cross-bar 15 of the stationary bar assembly, each link being pivoted near its rear end on an upright rivet 18 extending upwardly from the upper cross-bar 13 of the movable shutter bar assembly. Similarly disposed lower links 19 in a like manner connect the lower cross-bar 14 of the shutter bar assembly with the lower cross-bar 6 of the stationary bar assembly.

Each rearward rivet associated with the upper links extends upwards through an arcuate slot 20 in the horizontal web of the upper stationary cross-bar 15, this slot having its longitudinal edges curved about the axis of adjacent forward rivet 17. The slot also has its rear end disposed for engaging the rivet 18 (which projects through the slot) when the links have been swung rearwardly to such an extent (from the closure position of Fig. 6) as to dispose each shutter bar squarely behind one of the stationary grille bars as in Fig. 7. However, each slot 20 preferably extends forwardly to a sufficient extent so that its forward end will still be out of engagement with the corresponding rivet 18 when the edge flanges 12A on the movable shutter bars seat on the inner end portions of the stationary grille bars, as shown in Fig. 6.

Mounted on the upper cross-bar of the movable shutter bar assembly is an additional riser pin 22 which projects through an auxiliary arcuate slot 23 in the horizontal web of the upper stationary cross-bar 15, this slot 23 being a counterpart of the aforesaid slots 20 both in its shape and in relative disposition with respect to the element projecting through it. Interposed between this riser pin 22 and a riser post 24 (also mounted on the upper stationary cross-bar) is a tension spring 21, and the riser pin 23 is also fastened to a pull cable 25 which extends in the usual manner to a shutter-operating member of pull type on the dash of the automobile.

With the parts thus arranged, the spring 21 continually tends to hold the shutter closed namely with the lateral portions 12A of each shutter bar seated on the rear ends of the channel webs of two adjacent grille bars, while a pull on the cable 25 (toward the right in Fig. 5) will cause the shutter to be opened more or less according to the extent to which the cable is moved. With such a movement of the movable shutter bars, each shutter bar 12 moves in an arcuate path from the closure position shown in Fig. 6 (and shown in dotted lines for one blade in Fig. 9) through intermediate positions such as the one shown in full lines in Fig. 9, to the full open position of Figs. 7 and 8.

Owing to the combined lateral and rearward movement of each shutter bar during the opening of the shutter, the paths along which air is admitted through the shutter will vary both in width and in directions with different positions of the movable shutter grid; but this lateral movement of the movable grid will not interfere with a fairly uniform supply of air to the cells of the radiator core when the shutter is arranged (as here illustrated) so that the movable shutter bars are spaced somewhat forwardly from the core even when the shutter is fully opened.

For example, in the partly opened position of Fig. 9, the air entering between each two consecutive stationary bars 1 will be divided and deflected by the rearwardly diverging side faces of a movable shutter bar into two paths, respectively indicated at A and B, thus producing air currents which impinge against each other before passing the rear end of the space between two shutter bars 12; so that the impact of these two air currents will spread the air through a considerable angle (such as the angle C) to distribute air to core cells, including cells directly behind the movable shutter bars.

Moreover, the rearwardly converging disposition of the opposed side faces of each two adjacent stationary bars will cause a sufficient compressing of the air passing these faces, so that this air will expand somewhat laterally after leaving the space between these bars in the full-open position of the shutter (as indicated by the dotted lines D in Fig. 8), thereby causing part of the air to be deflected by the shutter bar side faces as shown by the lines E. Consequently, my shutter would readily provide a supply of air for all cells of the radiator core behind the shutter even if there were no suction fan behind this core.

In practice, the lengths of the parallel-motion links and the relative positions of their pivot axes can be varied considerably in proportion to the sizes and shapes of both sets of bars, provided that the resulting movement readily allows the most forward portion of each shutter bar to clear the rear end of a stationary bar which is adjacent to that shutter bar in the closed position of the shutter. To allow for this clearance while also providing each shutter bar with side faces of ample width for deflecting considerable air in the above described manner, I desirably dispose the forward pivot axis of each link near the common plane of the rear edges of the stationary bars. Since the shutter bars can be conveniently mounted on the forward webs of the cross-bars which space them, and since the horizontal webs of these cross-bars can be rather narrow (as shown in Figs. 6 and 7), my shutter requires no more depth than that needed for pivoted-blade shutters, and by having the forward end of each arcuate slot 20 freely spaced (in the closure position of the shutter) from the pin extending through it, I enable even a single spring to press all shutter bars firmly into their closure positions.

However, I do not wish to be limited to the use of the above described parallel links for supporting and moving my movable shutter member, nor to the channel-sectioned construction of the bars, or to other details of the construction and arrangement above disclosed, since many changes might be made without departing either from the spirit of my invention or from the appended claims. For example, Fig. 10 shows both closed and open positions of tubular shutter bars 28 used in connection with stationary bars of a substantially V-shaped channel section; while Fig. 11 similarly shows both the closed and the open positions of tubular shutter bars 28 used in a shutter in which the stationary bars 29 are also tubular. The direction in which the bars extend is also immaterial to the operation of my shutter, as these might be horizontal instead of vertical. Likewise, it will be obvious without illustration that the opening and closing of my shutter means a mere relative movement of one of my grid members with respect to the other, so that my shutter would function equally well if the rear member were stationary and the parallel-motion means were arranged for swinging the forward member forwardly during the opening of the shutter.

Nor do I wish to be limited to a shutter in which all bars of each of the relatively movable shutter members have either their forward or rear edges disposed in a common plane. For example, if the radiator front 30 is of a so-called V type, the stationary bars may be arranged in two sets (31 and 31A) which have their rear edges in forwardly converging planes, with a central bar 31B between the two sets, while the corresponding two sets of shutter bars (32 and 32A) are fastened respectively to the forwardly converging edges of a triangular truss 33. With two superposed trusses respectively fastened to the upright shutter bars at different heights, each truss forms a substantial counterpart of one of the shutter cross-bars 13 and 14 in Figs. 1 to 4, so that two pairs of links 16 will suffice for supporting and moving such a V-sectional movable shutter in the manner previously described for a shutter of generally flat type. Thus my invention also permits me to furnish a greatly simplified substitute for the two separate shutters heretofore required with V-type radiator fronts, in addition to eliminating the need of operating connections between the two shutters.

Moreover, since all of the movable bars of my shutter can be rigidly secured to the cross-bars which connect them, as for example by the welds W of Figs. 6, 7 and 13, and since the shape of the rearwardly open V-sectioned channels greatly stiffens these bars, I am able to obtain an unusually rigid and rugged construction even with thin metal employed for both sets of bars. At the same time, the elimination of the many pivot pins and bearings heretofore required in connection with shutters of the pivoted blade type greatly reduces the manufacturing cost and also avoids the rattling and other objections commonly encountered with separately pivoted shutter blades.

So also, my shutter readily affords a more handsome appearance to the front of a car than can be obtained with the heretofore customary pivoted blade types of shutters, both because its bars can be more conveniently and cheaply plated than ordinary shutter blades and because these bars do not expose sharp edges from which the plating is apt to be chipped off. With a pivoted-blade type of shutter, each blade when not in its closed position presents an edge as its most forward part, and it is well known that plating—particularly with chromium—chips off easily at the edge of any thin metal part. Consequently, the impact of gravel or the like would quickly mar the appearance of any pivoted-blade shutter if this had its blades plated.

On the other hand, it will be obvious from the accompanying drawings, that the most forward part of every bar in my shutter is of a convexed section to which the plating firmly adheres, and that the edges of the bars extend rearwardly and are shielded by other bars from the impact of gravel or the like. Consequently, my shutter construction enables me to provide a highly durable automobile radiator shutter which will have the appearance of a handsomely plated bar type of grille in summer, and one which will also be equally handsome whenever the shutter is either partly or entirely closed, since the relatively staggered disposition of the bars in the two shutter grids enhances the appearance of the shutter.

However, while I have illustrated and described my invention in embodiments designed for use on automobiles, I do not wish to be limited as to the uses of my shutter, and also do not wish to be limited to the conjoint use of all novel features of my invention.

I claim as my invention:

1. In a shutter, a stationary grid and a movable grid each comprising a plurality of uniformly spaced bars and cross-members rigidly connecting the said plurality of bars, all bars of both grids extending parallel to each other, parallel-motion means connecting the two grids for swinging the movable grid with respect to the stationary grid in an arcuate path about an axis parallel to the axes of the parallel bars from a relative position in which the bars of the two grids are relatively staggered in elevation, to a position in which the bars of the two grids aline in elevation.

2. In a shutter, a stationary grid and a movable grid each comprising a plurality of uniformly spaced bars and cross-members rigidly connecting the said plurality of bars, all bars of both grids extending parallel to each other, two pairs of parallel links each pivoted at its ends respectively to corresponding cross-members of the two grids, the said pivoting being on axes parallel to those of all of the grid bars, and means associated with one of the cross-members for halting a separational movement of the grids in a position in which the bars of one grid have their axes respectively alining (in a plane at right angles to the face of both grids) with those of the other grid.

3. A shutter as per claim 2, in which the common plane through both pivot axes of each link is at a sharply acute angle to the plane of rear edges of the bar on either grid when the shutter is closed.

4. A shutter including two grids each comprising a plurality of upright bars of the same consecutive spacing and two vertically spaced cross-members, the cross-member of each grid having an upright face to which all bars of that grid are fastened and also presenting a horizontal web; two similarly disposed pairs of parallel links each extending across the horizontal webs of the corresponding cross-members on the two grids, upright pivot pins respectively connecting each link with each of the webs across which that link extends; a plate fast with respect to one grid and having an arcuate slot through which a pivot pin associated with the other grid extends, the said slot being curved about the axis of the companion pivot pin associated with the last recited pivot pin and being of such length that one end thereof will engage the said last recited pivot pin to limit the movement of the said links in one direction only.

5. The combination with the radiator core of an automobile and with a radiator front having a panel front spaced forwardly from the said core, of a shutter comprising: a stationary bar-type grid including uniformly parallel spaced bars extending across the opening within the radiator shell, a movable bar-type grid including parallel bars of similar spacing each of which bars in the closed position of the shutter spans the opening between two consecutive bars of the stationary grid, connecting members pivoted to both grids for supporting the movable grid with freedom for conjoint movement of the movable grid rearwardly and laterally with respect to the stationary grid, and means operatively interposed between the two grids for limiting the movement of the movable grid in the said direction to a position in which the bars of the movable grid are freely spaced rearwardly from the bars of the stationary grid and forwardly from the core.

6. A shutter for controlling the flow of air through an aperture, comprising parallel and consecutively spaced stationary grille bars extending across the said aperture, a rigid assembly of parallel shutter bars each of which bars is adapted to close the openings between two consecutive stationary bars, and parallel links each pivotally connected at its opposite ends to both of the said assemblies on pivot axes parallel to all of the said bars; the said links supporting the assembly from the stationary bar assembly, whereby a movement of the said links in one direction will swing the shutter bars rearwardly out of their said opening-closing positions and into positions in which the shutter bars respectively aline transversely of the general plane of the said opening with stationary grille bars.

7. A shutter as per claim 6, in which the pivot axes of the connections of the links to the grille bar assemblage are parallel to the grille bars and approximately in the same plane with the rear edges of the shutter bars.

8. A shutter as per claim 6, including means associated with one of the links for halting the movement of the links in the said direction when the shutter bars are in the recited alinement respectively with the grille bars.

9. A shutter for controlling an air inlet aperture, comprising an assemblage of parallel stationary grille bars extending across the aperture, a rigid movable assemblage of shutter bars each extending between two adjacent grille bars and having its lateral edge portions respectively overlapping and engaging the rear face of the edge portions of the said adjacent stationary bars when the shutter is closed; two frames in which the grille bars and the shutter bars are respectively mounted; and means interposed between the said two assemblages for moving the shutter bar assemblage rearwardly and laterally of the bars of the first named assemblage, the said means comprising an equal number of pivot pins respectively associated with each frame and all extending parallel to both the grille bars and the shutter bars and links each connecting a pivot pin associated with one frame with a pivot pin associated with the other frame.

10. A shutter as per claim 9, and means for halting the movement of the shutter bar assemblage in a position in which the longitudinal medial line of each shutter bar is in a common plane (at right angles to the general plane of the stationary bars) with the medial longitudinal line of one of the stationary shutter bars, the said halting means comprising a stop on one frame disposed for engaging one of the pivot pins.

LEE B. GREEN.